United States Patent [19]
Marazzo et al.

[11] Patent Number: 5,598,647
[45] Date of Patent: Feb. 4, 1997

[54] MATERIAL TRANSFER APPARATUS AND METHOD

[75] Inventors: Joseph Marazzo, Basking Ridge, N.J.; Frank Russo, Swiftwater, Pa.; Michael G. Palmer, Easton, Pa.; Gary L. Hartman, East Stroudsburg, Pa.

[73] Assignee: Brooklyn Union Gas, Brooklyn, N.Y.

[21] Appl. No.: 473,988

[22] Filed: Jun. 7, 1995

Related U.S. Application Data

[63] Continuation-in-part of Ser. No. 213,520, Mar. 16, 1994, Pat. No. 5,487,228.

[51] Int. Cl.⁶ .................................................. B65G 53/14
[52] U.S. Cl. .............................. 37/317; 222/202; 406/173
[58] Field of Search ...................... 37/311, 317; 222/196, 222/202, 203, 500, 58; 406/151, 152, 153, 168, 173

[56] References Cited

U.S. PATENT DOCUMENTS

| | | | |
|---|---|---|---|
| 661,609 | 11/1900 | Hoover et al. | 406/151 X |
| 705,310 | 7/1902 | Seifert | 406/168 X |
| 1,211,310 | 1/1917 | Griffin | 406/151 X |
| 2,732,099 | 1/1956 | Davis | 222/203 X |
| 3,423,130 | 1/1969 | Milner | 406/168 X |
| 3,700,145 | 10/1972 | Schluten | 222/202 |
| 4,081,110 | 3/1978 | Evans | 222/203 X |
| 4,812,086 | 3/1989 | Kopermuky | 406/153 |

Primary Examiner—Terry Lee Melius
Assistant Examiner—Robert Pezzuto
Attorney, Agent, or Firm—Fitzpatrick, Cella, Harper & Scinto

[57] ABSTRACT

In a material transfer system, material from an excavation is drawn into a vessel by suction from a vacuum source. The vessel has discharge flaps at the bottom that are held closed by the suction. When the weight of the material in the vessel reaches a predetermined value, the flaps open and the material is discharged from the vessel. After the discharge, counterweights almost close the flaps and the suction seals the discharge flaps so that additional material is drawn into the vessel. The vessel includes a vibratory section and has sides that slope outwardly from top to bottom. The material entering the vessel contacts the vibratory section at a predetermined angle and is redirected to the discharge flaps without any caking on the vessel walls. The opening through the discharge flaps is larger than the inlet through which the material enters the vessel so that objects entering the vessel are discharged.

8 Claims, 7 Drawing Sheets

MATERIAL TRANSFER APPARATUS AND METHOD

This application is a continuation-in-part of Ser. No. 08/213,520, filed Mar. 16, 1994, now U.S. Pat. No. 5,487,228.

BACKGROUND OF THE INVENTION

1. Field of the Invention

The invention relates to material transfer arrangements and, more particularly, to movement of materials at excavation sites under vacuum pressure.

2. Background of the Invention

The invention generally concerns apparatus that collecting soil type material from excavations during pipe replacement or similar digging operations. In such operations, it is necessary to extract soil from a hole to obtain access to underground apparatus such as a pipe. As is well known, manual removal of such material from an excavation is both labor intensive and costly.

Devices to transfer materials between locations by collecting material in a container such as a hopper and then dumping the collected material have been used extensively. U.S. Pat. No. 1,211,310 issued Jan. 2, 1917 to L. A. Griffin, for example, discloses an excavation handler with a dump valve in which material enters a hopper under steam pressure and is dumped through a small manually operated valve in the hopper bottom.

U.S. Pat. No. 3,423,130 issued Jan. 21, 1969 to J. G. Milner employs a hopper to collect material using a self-contained vacuum source to draw the material into the hopper. The vacuum source includes a level control switch operative to remove the vacuum when the hopper is full. Upon removal of the vacuum, the hopper is vented to the atmosphere and the collected material is dumped out of the hopper through a discharge spout.

U.S. Pat. No. 1,115,194 issued Oct. 27, 1914 to W. G. Hay discloses apparatus in which material enters a container through an inlet under vacuum pressure and is collected therein. The bottom of the container is conical in shape and includes an aperture held closed by the vacuum pressure. When the weight of the collected material exceeds a predetermined value, the valve is forced open so that the collected material drops through the aperture.

U.S. Pat. No. 3,645,582 issued Feb. 29, 1992 to H. Siemetzki controls the level of material collected in a hopper by means of a solenoid valve at the hopper inlet. Upon receiving signals from sensors inside the hopper, the solenoid valve closes the inlet. In another material transfer device disclosed in U.S. Pat. No. 4,172,535 issued Oct. 30, 1979 to K. C. Smith, movement of collected material in a hopper is controlled by determining the weight of the hopper and its contents.

U.S. Pat. No. 4,270,671 issued Jun. 2, 1981 to J. B. Arnold utilizes a cylindrical hopper having an expandable bellows portion. Particulate material such a grain, sand or cement are supplied to the hopper through an upstream conduit angled so that the particulate material impinges on a sheet metal box which absorbs kinetic energy and redirects the material into the hopper.

Material removed from excavation sites generally contains compressible materials such as soil mixed with other larger objects such as rocks and debris. In using the aforementioned hopper arrangements at excavation sites to replace manual removal, soil in the collected material tends to pack on the sides. Such packing of compressible material impedes both collection and discharge of material. The hoppers in the aforementioned arrangements that employ funnel shaped bottom portions to direct material discharge through a restricted aperture in the funnel are likely to suffer from caking of collected material on the sides of the hopper and in the funnel which tends to block material dumping. Also, rocks and other debris in the collected material in the funnel interfere with closure of the discharge mechanism. In the cylindrical hopper system of aforementioned U.S. Pat. No. 4,270,671, particulate material can cake and accumulate on the kinetic energy absorption box and rocks and debris falling on the kinetic energy absorber may interfere with flow of the particulate material.

BRIEF SUMMARY OF THE INVENTION

The invention is directed to a material transfer device having a top section that includes a vacuum inlet, a middle section that includes a material inlet and an openable bottom section held in a closed position against the middle section by suction from the vacuum inlet. Material is drawn into the middle section through the material inlet by the suction applied to the vacuum inlet. The bottom section opens in response to the weight of accumulated material exceeding a predetermined value and the material is discharged.

According to one aspect of the invention, the material entering through the material inlet is directed to a vibratory portion of the middle section. Upon contact with the vibratory portion, the material is redirected to the bottom section. Advantageously, vibration of the vibratory portion in response to the vacuum pressure and impinging material prevents caking of compressible material drawn into the device.

According to another aspect of the invention, the bottom section opens in response to a predetermined weight of the material redirected from the vibratory portion. A counterweight positions the bottom section in an almost closed state after the discharge of the material.

According to yet another aspect of the invention, wall or walls of the middle section extend downward and outward from the top section to the bottom section so that the material contacting the vibratory portion is redirected to the bottom portion without touching the middle section.

According to yet another aspect of the invention, the bottom section includes a plurality of plates which pivot on the bottom edge of the middle section to close so that accumulated material is held in the device.

According to yet another aspect of the invention, the material inlet directs the material into the middle section to contact the vibratory portion at a predetermined angle.

According to yet another aspect of the invention, the middle section is a hollow truncated rectangular pyramid having its smaller end intersecting the top section and its larger end intersecting the bottom section of the material transfer device.

According to still yet another aspect of the invention, a weight responsive valve is formed at the vacuum inlet to the hopper by a first apertured flange attached to the vacuum inlet and a second apertured flange attached to a vacuum conduit connected to a vacuum source. When the weight of accumulated material on the flapper doors exceeds a predetermined value, the first and second apertured flanges separate to remove the suction applied to the vacuum inlet.

In an embodiment of the material transfer device illustrative of the invention, material is collected in a truncated rectangular pyramid shaped hopper having a vacuum inlet at a smaller top end and a pair of flapper type doors forming a larger bottom end. Excavated material is drawn into the middle section through an inlet in one side of the hopper and is directed to a vibratory membrane on an opposite side of the middle section at a predetermined angle. The vibratory membrane redirects the contacting material to the flapper type doors forming the bottom section. When the weight of the redirected material exceeds a predetermined value, the doors open to discharge the collected material. Counterweights on the doors move the doors to an almost closed state and the vacuum pressure causes the doors to fully close. The hopper then receives and retains additional excavated material.

In another embodiment, a first apertured flange is attached to a vacuum conduit at a fixed position and a second apertured flange is attached to the vacuum inlet to form a passageway to apply suction to the hopper. Plural coil spring structures couple the second apertured flange to the first apertured flange so that the hopper is suspended from the coil springs. In response to the weight of accumulated material on the flapper doors, the first apertured flange separates from the second apertured flange, the suction is removed from the hopper so that the flapper doors open.

In accordance with the invention, compressible material entering the device is redirected to the bottom section by the membrane set into vibration responsive to the vacuum pressure and the impinging material without caking on the sides of the middle section. Further, the pyramidal shape of the middle section assures that rocks and debris do not interfere with material discharge through the doors of the bottom section.

The invention will be better understood from the following more detailed description taken with the accompanying drawings and claims.

DETAILED DESCRIPTION

Figure 1:
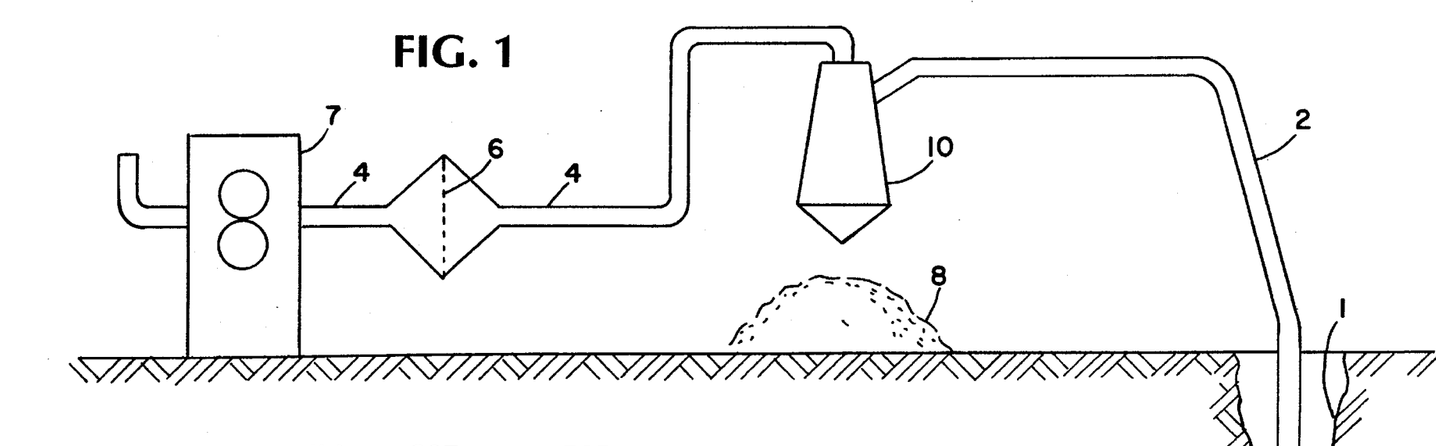
FIG. 1 depicts a system for transferring material from an excavation illustrative of the invention.

FIG. 1 depicts a general view of a material transfer system illustrative of the invention adapted to remove material from an excavation. In FIG. 1, the transfer system includes a hopper 10, a material conduit 2 (e.g., a hose) having an outlet end on a sidewall of the hopper 10 and an open inlet inserted into an excavation 1. A vacuum source 7 is coupled to a top section of the hopper 10 through a vacuum conduit 4 in which a filter 6 is inserted.

Suction is supplied to the top of the hopper 10 from vacuum source 7 which draws air from the hopper 10 through the filter 6 and vacuum conduit 4. The suction at the top of the hopper 10 functions to draw material from the excavation 1 into the hopper 10 through the material conduit 2. Material entering the hopper 10 from the material conduit 2 contacts a side wall opposite the material inlet and is redirected to the bottom of the hopper 10. When the weight of the material accumulating on a normally closed bottom of the hopper 10 exceeds a predetermined value, the bottom opens and the accumulated material is discharged to a location 8 underneath the hopper 10. After the material is evacuated from excavation 1 and work in the excavation is completed, the system shown in FIG. 1 may be used to replace the evacuated material into the excavation 1. To refill the excavation, the hopper 10 is moved over the excavation 1 and the open inlet of the material conduit 2 is be placed over the material discharged at location 8.

Figures 2, 3, 6:
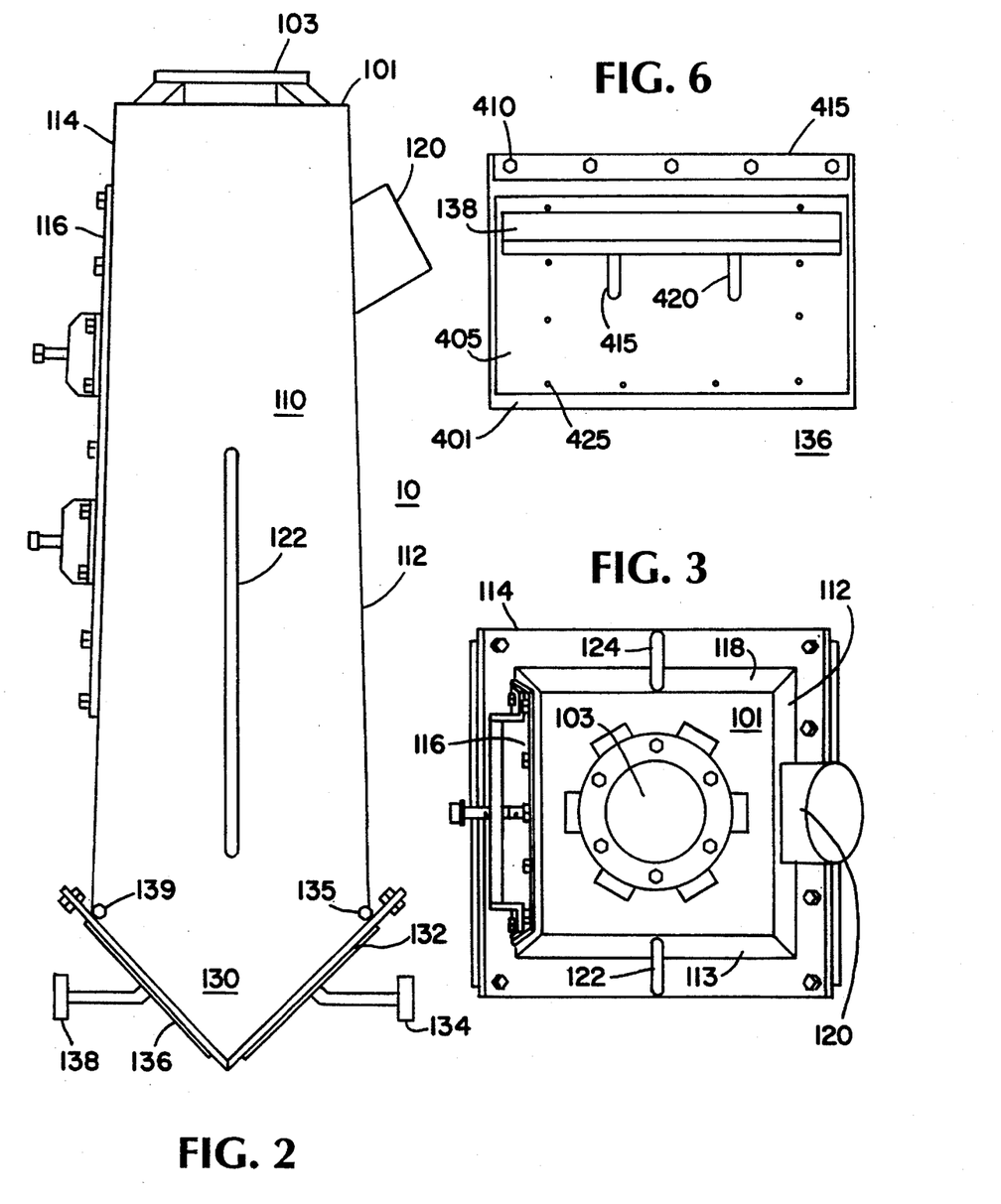
FIG. 2 depicts a side view of a material transfer vessel illustrative of one embodiment of the invention.
FIG. 3 depicts a top view of the material transfer vessel shown in FIG. 2.
FIG. 6 is a plan view of a flapper type door of the material transfer vessel shown in FIG. 2.

FIG. 2 shows a side view of the hopper 10 and FIG. 3 shows a detailed top view of the hopper 10. As illustrated in FIGS. 2 and 3, the hopper 10 has a top section 101, a middle section 110 with four side walls 112, 113, 114 and 118 and a bottom section 130. The top section 101 is rectangular in shape and includes a vacuum inlet 103 through which air is drawn from the hopper middle section by the vacuum source 7. The side wall 112 of the middle section 110 includes a material inlet 120 that is connected to one end of the material conduit 2. The side wall 114 opposite the side wall 112 with material inlet 120 has a vibratory portion 116 which includes a neoprene or other type diaphragm. The material inlet 120 is cylindrical and has an axis directed so that material entering from conduit 2 impinges on the vibratory portion 116 at a predetermined angle. The predetermined angle between the vibratory portion and the axis of the material inlet may be between 50° and 70° and is preferably 60°.

After striking vibratory portion 116, the impinging material is redirected downward to the bottom section 130. The walls 112, 113, 114 and 118 which form the middle section 110 extend downward and outward from the smaller rectangular top section 101 to the larger bottom section 130. Each of side walls 112, 113, 114 and 118 is trapezoidal in shape. Side walls 113 and 118 have triangular shaped bottom edges as shown in FIG. 2 while the side walls 112 and 114 have horizontal bottom edges. The bottom section of the hopper 10 includes two rectangular shaped flapper doors 132 and 136. The flapper door 132 is pivotally attached to the bottom of the side wall 112 by a hinge 135 and flapper door 136 is pivotally attached to the bottom of the side wall 114 by a hinge 139. Each flapper door 132 and 136 extends from its hinge to meet at a line below the lower edges of side walls 112 and 114 as shown in FIG. 2.

A counterweight 134 attached to the flapper door 132 biases the flapper door to pivot clockwise. Similarly, a counterweight 138 on the flapper door 136 biases that door to pivot counter clockwise. Thus, the flapper doors are normally biased by the counterweights 134 and 138 to close against the triangular bottom edges of the side walls 113 and 118. With flapper doors 132 and 134 closed, the suction from vacuum source 7 is effective to draw material from the material conduit 2 into the interior of the middle section 110 of the hopper 10. As the weight of accumulated material redirected downward from vibratory portion 116 increases, the pressure to pivot the flapper door 132 counterclockwise and the pressure to pivot the flapper door 136 clockwise increases.

The inlet 120 is angled with respect to the hopper 10 so that material entering the inlet 120 from the material conduit 2 is directed against the vibratory portion 116 of the side wall 114. The membrane of vibratory portion 116 is drawn inward by the suction created by the vacuum source 7 and is expanded outward by material from the material inlet 120. As a result, the membrane is set into a vibrating mode. This vibration of the membrane prevents compressible material from material inlet 120 from caking on the vibratory portion 116. The material is redirected from the vibrating membrane of the vibratory portion 116 to flapper doors 132 and 136 and is thereby prevented from accumulating on any of the side walls 112, 113, 114 and 118. Since the flapper doors 132 and 136 extend across the entire bottom section 130, the redirected material only falls on the flapper doors 132 and 134 of the bottom section 130.

When the weight of the accumulated material on the closed flapper doors 132 and 134 exceeds a predetermined value, the flapper doors 132 and 136 pivot open. Opening of the flapper doors 132 and 136, removes the suction in the material inlet 120 of the hopper 10 so that material stops entering from the material inlet 120 and the material accumulated on flapper doors 132 and 136 is discharged through the opening made by pivoted doors 132 and 136. Since the flapper doors extend the full area of the bottom section, all of the material including rocks and other debris that entered through the smaller cross section material inlet 120 are discharged along with the soil-like compressible material.

Figure 4:
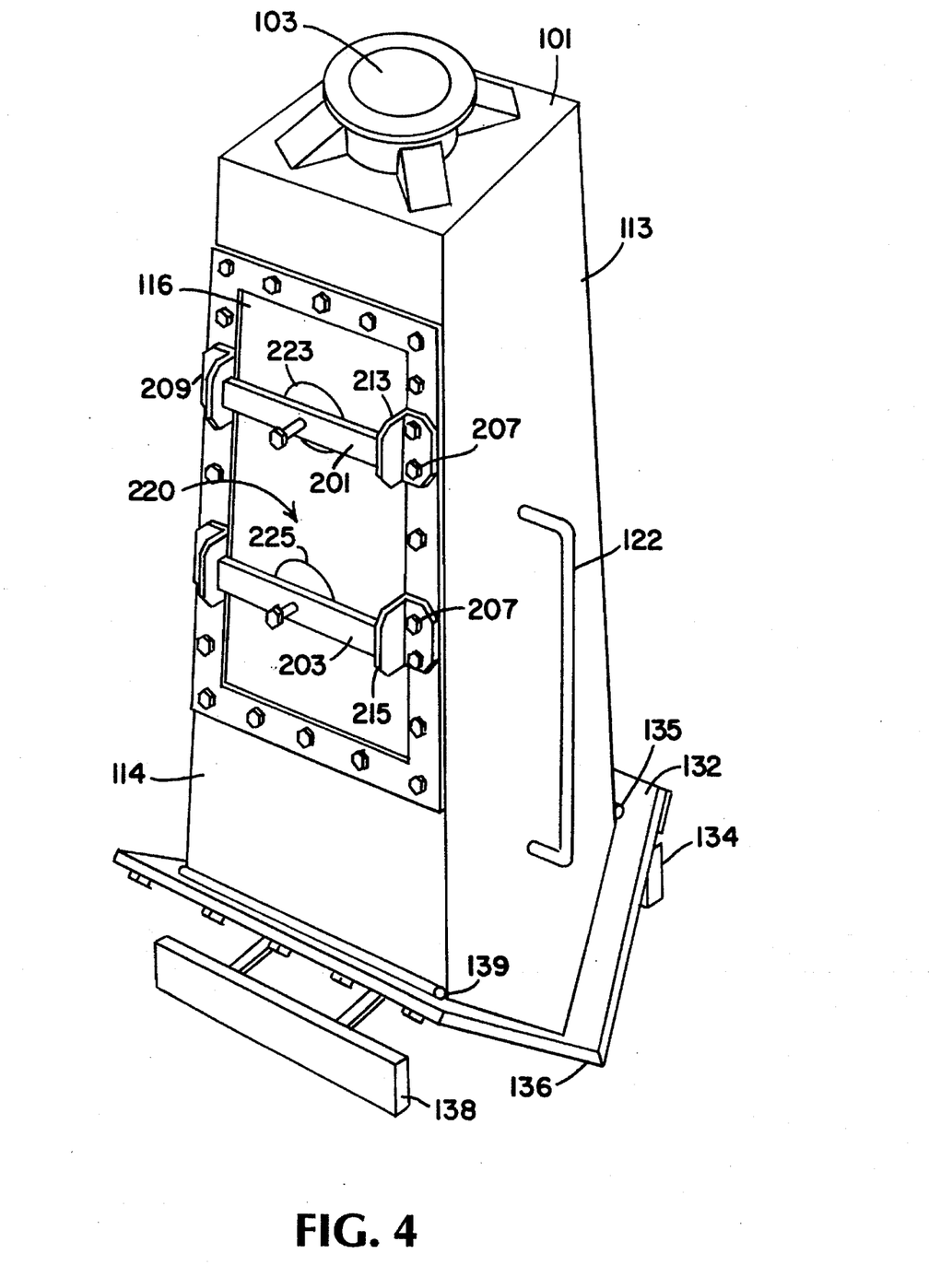
FIG. 4 depicts a perspective view of the material transfer vessel that illustrates the construction of a vibratory section thereof.

FIG. 4 depicts a perspective view of the hopper 10 which illustrates the construction of the vibratory portion 116 on side wall 114. In FIG. 4, there is shown side wall 114 with vibratory portion 116 therein. The vibratory portion 116 includes a rubber membrane 220, a frame 206, cross bars 201 and 203, bolts 207 that connect the frame 206 to the side wall 116 and handles 122 and 124 (not shown). Also shown are the flapper doors 132 and 136 and the counterweights 134 and 138. The edges of the rubber membrane 220 are placed between the frame 206 and the edges of an opening for the vibratory portion 116 in the sidewall 114. The frame 206 and the rubber membrane 220 are then attached to the edges of the opening in the side wall 116 by bolts 207 which are spaced along the frame. The arrangement of the frame 206 on the side wall 114 seals the edges of the rubber membrane 220 in the side wall 114.

Upper cross bar 201 extends horizontally across the rubber diaphragm 220 and is attached by ends 209 and 213 to opposed edges of the side wall 114 by pairs of the bolts 207. A center post structure 223 connects the cross bar 201 to the rubber membrane 220 to limit the travel of the rubber membrane in response to the vacuum pressure from inlet 103. Similarly, the lower cross bar 203 extends horizontally across the rubber diaphragm 220 and is attached by ends 211 and 215 to the edges of side wall 114 by pairs of the bolts 207. A center post structure 225 connects the cross bar 203 to the rubber membrane 220 to limit the travel of the rubber membrane in response to the vacuum pressure from inlet 103.

Figure 5:
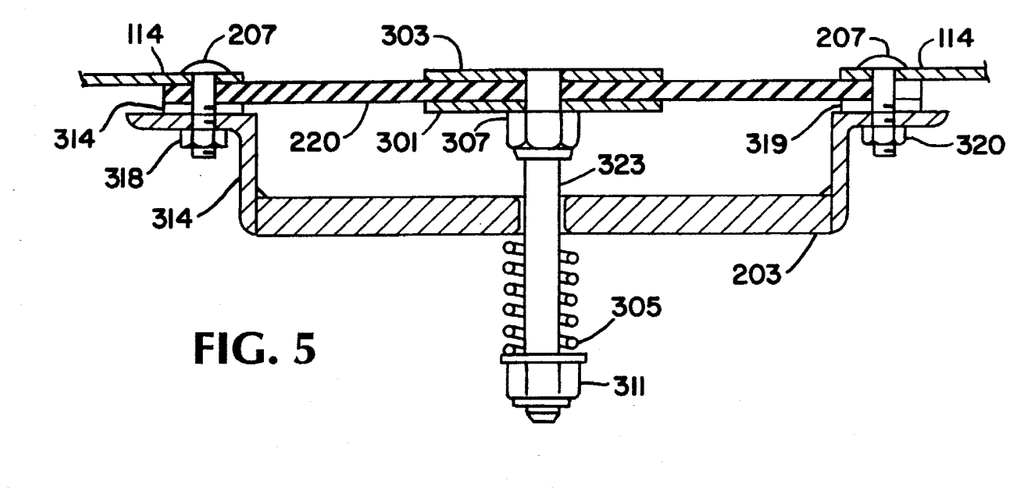
FIG. 5 is a cross-section of the vibratory section of FIG. 4 showing a cross bar and its connection to a rubber membrane of the vibratory section.

FIG. 5 shows the structure of the cross bar 203 and its connections to the side wall 116 and to the rubber membrane 220 in greater detail. Referring to FIG. 5, one bolt 207 extends through apertures in side wall 114, rubber membrane 220, a washer 314 and the L shaped end section 209 and the assembly is held in place by a nut 318. Similarly, another of bolts 207 is inserted through aligned apertures in side wall 114, rubber membrane 220, a washer 319 and the L shaped end section 213 and the resulting assembly is held in place by a nut 320.

The center post structure 223 includes a threaded post 323, nuts 307 and 311, washers 301 and 303 and helical spring 305. The threaded post 323 extends through a center aperture in cross bar 203 and through an aperture in rubber membrane 220. The washer 303 is connected to the threaded post 323 by welding or other means and the nut 307 is tightened against the washer 301 so that the rubber membrane is held between washers 301 and 303. The helical spring 305 extends on the outside of the cross bar 203 from a nut 311 at the outer end of the threaded post 323 to the surface of the cross bar 203 surrounding the center aperture therein. The helical spring compresses in response to the vacuum pressure from inlet 103 and determines the extent of travel of the rubber membrane into the opening in the side wall 114.

In operation, the rubber membrane 220 is held in a sealed state against the edges of the opening in the side wall 114 by the frame 206. When suction is applied through the vacuum inlet 103, the rubber membrane is drawn into interior of the hopper 10 and is restrained by the compression of the helical spring 305 of the center post structure 223. Material drawn into the hopper 10 through the material inlet 120 strikes the rubber membrane 220 at a predetermined angle and forces the rubber membrane outward. The combination of suction from the vacuum inlet 103 and the impinging material from the material inlet 120 at the predetermined angle causes the rubber membrane 220 to vibrate. This vibration of the rubber membrane 220 prevents caking of compressible material from the excavation so that the material striking the rubber membrane 220 is redirected without caking to the flapper doors 132 and 136 which form the bottom section 130 of the hopper.

Figure 7:
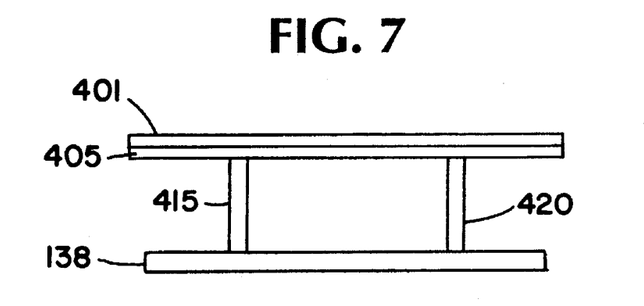
FIG. 7 is a side view of the flap type door shown in FIG. 6.

FIG. 6 shows a plan view of a flapper door structure that may be used as the flapper door 136 in the hopper depicted in FIG. 2. FIG. 7 shows a side view of the flapper door 136. As shown in FIG. 6, the flapper door includes an aluminum plate 405 that provides backing for a rubber plate 401 which extends beyond the aluminum plate. The aluminum and rubber plates are held in juxtaposed relationship by end bolts 410 at an end 415 of the flapper door and by sheet metal type screws 425 extending through the aluminum plate 405 and the rubber plate 401 from the surface of the aluminum plate 405. As aforementioned the flapper door includes a hinge portion (not shown) inward of an end 415 that permits the flapper door 136 to pivot around the bottom edge of the side wall 116. The flapper door 132 has substantially the same construction and is structured to pivot around the bottom edge of side wall 112.

The counterweight 138 is attached to the aluminum plate by rods 415 and 420. Flapper door 132 shown in FIG. 2 is similarly arranged. In operation, the flapper door 136 pivots to close against the diagonal bottom edges of the side walls 113 and 118 and the flapper door 132 pivots to close against the diagonal bottom edges of the side walls 113 and 118 in response to the weight of the counterweights 138 and 134, respectively. While suction is applied to the interior of the hopper 10, the rubber plates extending beyond the aluminum backing plates 405 assure that the flapper doors seal the bottom section 130.

The flapper doors remain in closed against the bottom edges of side walls 112, 113, 114 and 118 until the weight of material redirected from the rubber membrane 220 exceeds a predetermined value. The flapper doors 132 and 136 then open and the material accumulated thereon is discharged. After the discharge of the material, the flapper doors 132 and 136 are brought to an almost closed state and the vacuum pressure seals the flapper doors against the sides of the hopper 10. The suction at the material inlet 120 of the hopper 10 is then reestablished and additional material is drawn into the hopper 10 through material conduit 2.

Figure 8:
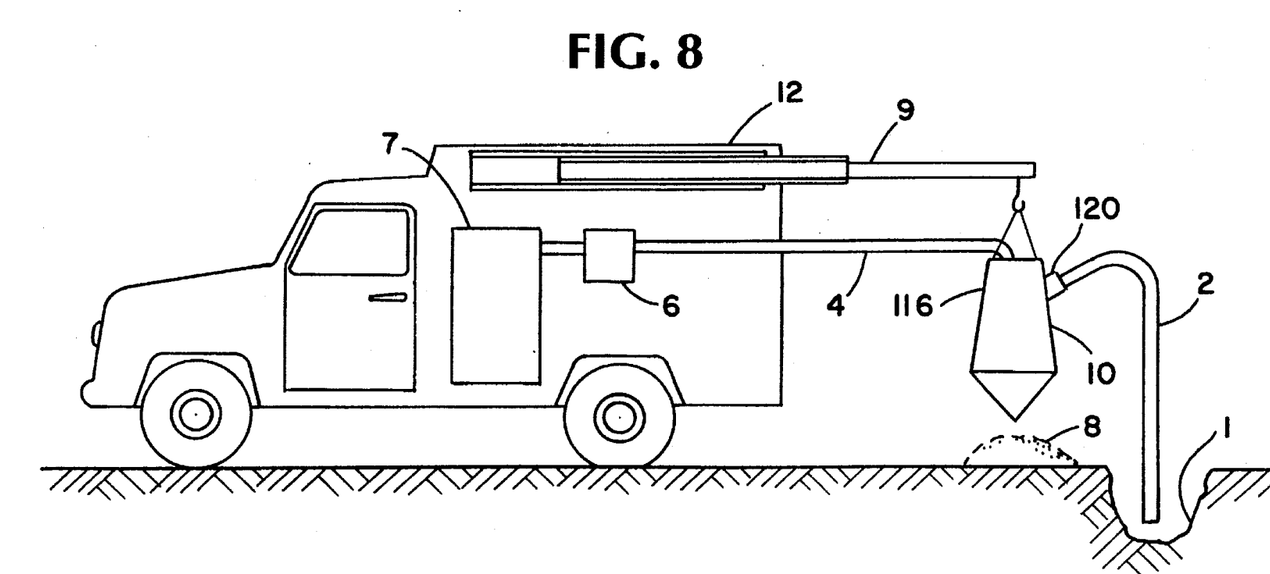
FIG. 8 illustrates a portable system adapted to transfer soil from between an excavation and a remote site in-accordance with the invention.

FIG. 8 illustrates a portable system adapted to remove soil from excavations in accordance with the invention. In FIG. 8, the hopper 10, the vacuum source 7, the filter 6 and conduits 2 and 4 are placed in a truck 12 for movement to an excavation site. The hopper 10 is mounted on an extendible boom 9 so that it may be positioned over the area 8 where material from an excavation is to be transferred from the excavation 1. When in position over the area 8, the vacuum conduit 4 is coupled to the vacuum source 7 through the filter 6 and the material conduit 2 is coupled between the material inlet 120 of the hopper 10 and the excavation 1 from which material is to be removed.

Material from the excavation 1 is drawn into the material inlet 120 and is directed at a preset angle (e.g., 60°) to the vibratory portion 116 of the hopper. Upon contact with the vibratory portion 116, the material is redirected to the doors 132 and 136 of the bottom section 130. After the weight of the accumulated material on the doors 132 and 136 exceeds a prescribed value, the doors 132 and 136 open to discharge the material at the area 8.

After the material discharge, the door counterweights 134 and 138 pivot the doors 132 and 136 into an almost closed state and the vacuum pressure from vacuum source 7 seals the bottom section 130. Additional material from the excavation 1 is then drawn into the hopper 10. The operation is repeated until all the soil to be removed from the excavation 1 is removed. Subsequent to completion of repair or other work in the excavation, the hopper 10 is moved over the excavation 1 and the material conduit 2 is placed in proximity to the material in the area 8. The vacuum source 7 is turned on and the material from the area 8 is transferred to the excavation 1 through the hopper 10 as described with respect to the soil removal operation.

Figure 9:
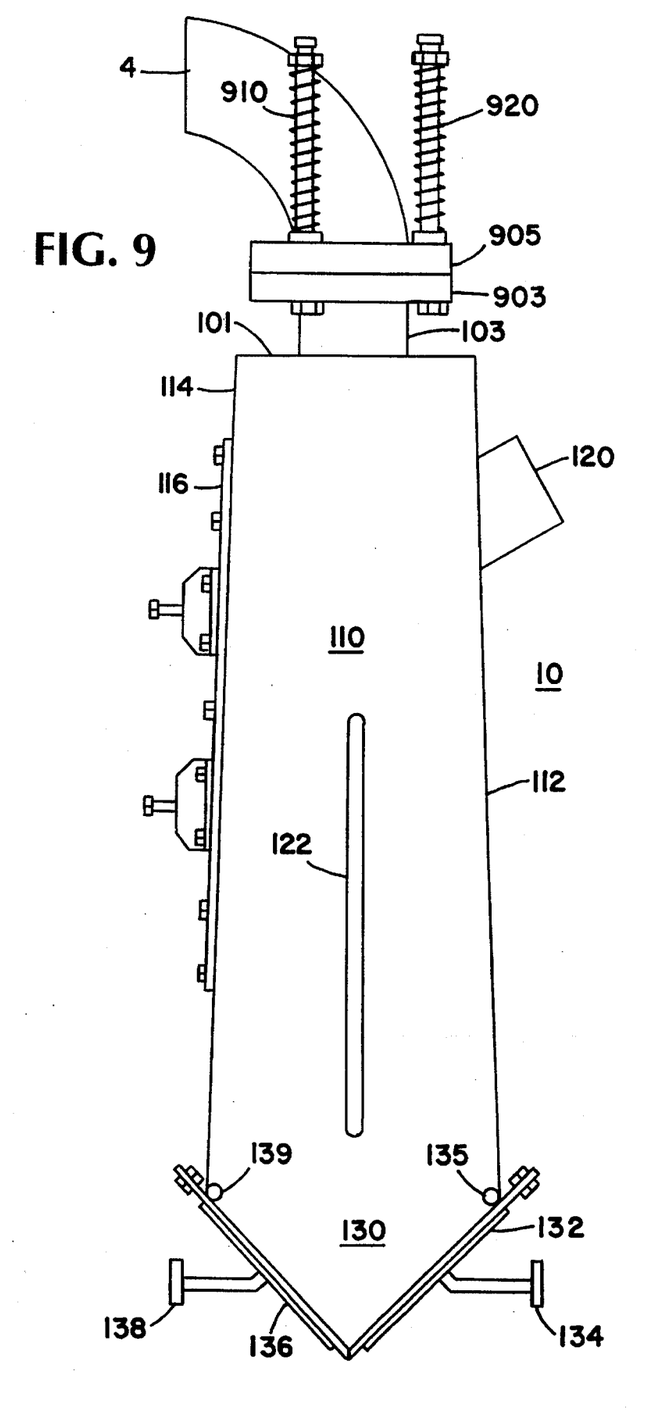
FIG. 9 depicts a side view of a material transfer vessel illustrating another embodiment of the invention.
Figure 10:
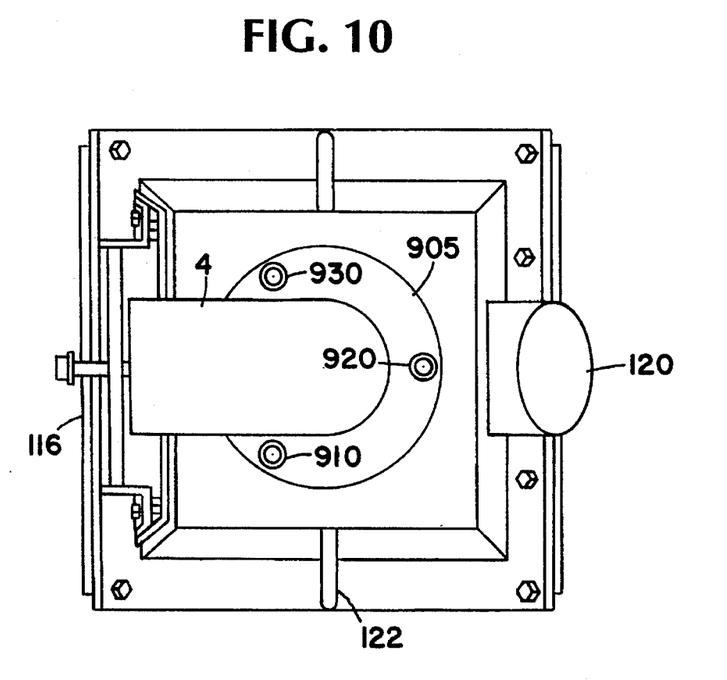
FIG. 10 depicts a top view of the material transfer vessel shown in FIG. 9.

FIGS. 9 and 10 illustrate another embodiment of the invention in which a weight responsive valve is interposed between the vacuum conduit 4 of FIG. 1 and the vacuum inlet 103 of the hopper 10 so that the suction is removed from the hopper 10 when a predetermined amount of material accumulates on the bottom section. With the arrangement of FIG. 9, the opening of the flapper doors 132 and 136 is independent of the suction applied by the vacuum source. As a result, a wide range of vacuum sources may be employed.

In addition to the structural elements described with respect to FIG. 2, the apparatus of FIGS. 9 and 10 includes an apertured flange 903 attached at an upper end of vacuum inlet 103 and an apertured flange 905 attached at a lower end of the vacuum conduit 4. The vacuum conduit 4 is attached to a fixed object such as an extendible boom and the hopper 10 is suspended by the spring elements 910, 920 and 930. In the absence of material on the flapper doors 132 and 136, the upper surface of apertured flange 903 is in contact with the lower surface of apertured flange 905, a passageway is formed between the vacuum conduit 4 and the vacuum inlet 103 so that suction is applied to interior of the hopper 10 through the passageway formed by the apertured flanges 903 and 905.

Spring elements 910, 920 and 930 shown in FIGS. 9 and 10 are disposed symmetrically on the apertured flange 905 and are coupled between the apertured flanges 903 and 905 to maintain the flanges in contact while the weight of material on the flapper doors 132 and 136 is less than or equal to a predetermined value. When the predetermined value is exceeded, the spring elements 910, 920 and 930 are compressed so that the lower surface of the flange 905 separates from the upper surface of the flange 903.

Figure 11:
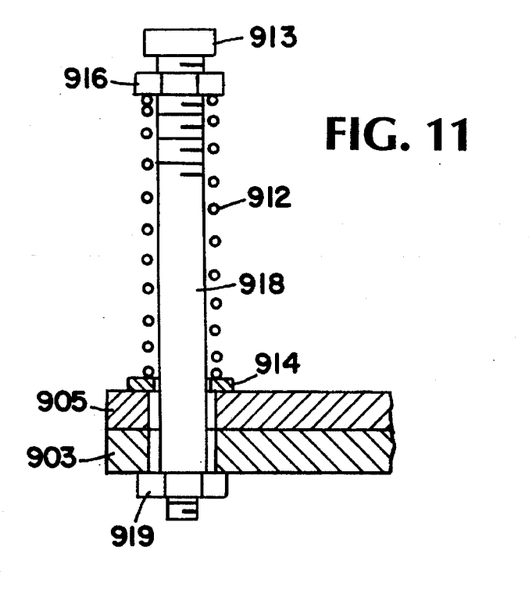
FIG. 11 is a more detailed view of the one coupling arrangement of the embodiment shown in FIGS. 9 and 10.

The spring element 910 in one coupling arrangement of the flanges 903 and 905 of FIGS. 9 and 10 is shown in greater detail in FIG. 11. Referring to FIG. 11, the spring element 910 includes a threaded rod 918 extending through aligned holes in flanges 903 and 905, a jamb nut 919 fastened to a lower end of the threaded rod 918 on the lower surface of the flange 903, a coil spring 912 on an outer surface of the threaded rod 918 which contacts a washer 914 on the upper surface of the flange 905, an adjustment nut 916 which controls the compression of the coil spring 912 and a covering washer 913 at the top of the threaded rod 918. The structures of spring elements 920 and 930 correspond to that of spring element 910.

Since the vacuum conduit 4 is attached to the extendible boom 9 as shown in FIG. 8, the flange 905 is at a fixed position relative to the boom 9. The flange 903 and the other portions of the hopper structure are coupled to the fixed flange 905 through the coil springs of the spring elements 910, 930 and 930. As a result, the coil springs of elements 910, 920 and 930 are further compressed from an initial point in responsive to the weight of the hopper, the weight of the material on the flapper doors 132 and 136 and the vacuum inside the hopper 10. The coil springs are adjusted to cause the flanges 903 and 905 to separate when a predetermined amount of material accumulates in the hopper 10. A rubber or other material seal ring (not shown) may be mounted on the threaded rods of the spring elements between the flanges to assure that suction is applied to the hopper when the flanges are in a moved to a closed position.

In operation of the embodiment of FIGS. 9 and 10, the coil springs of spring elements 910, 920 and 930 hold the upper surface of the apertured flange 903 in contact with the lower surface of the apertured flange 905 while material enters the hopper 10 in response to the suction induced by the vacuum source 7 of FIG. 1. As material accumulates on flapper doors 132 and 136, the downward directed force on the coil springs of the spring elements increases. When the weight of the material in flapper doors 132 and 136 reaches a predetermined value, the coil springs are further compressed so that the upper surface of the apertured flange 903 moves downward. The vacuum inlet 103 is thereby exposed to atmospheric pressure and the flapper doors 132 and 136 open to discharge the material. Advantageously, the opening of the flapper doors responsive to the separation of the apertured flanges 903 and 905 is substantially independent of the size of the vacuum source.

Figure 12:
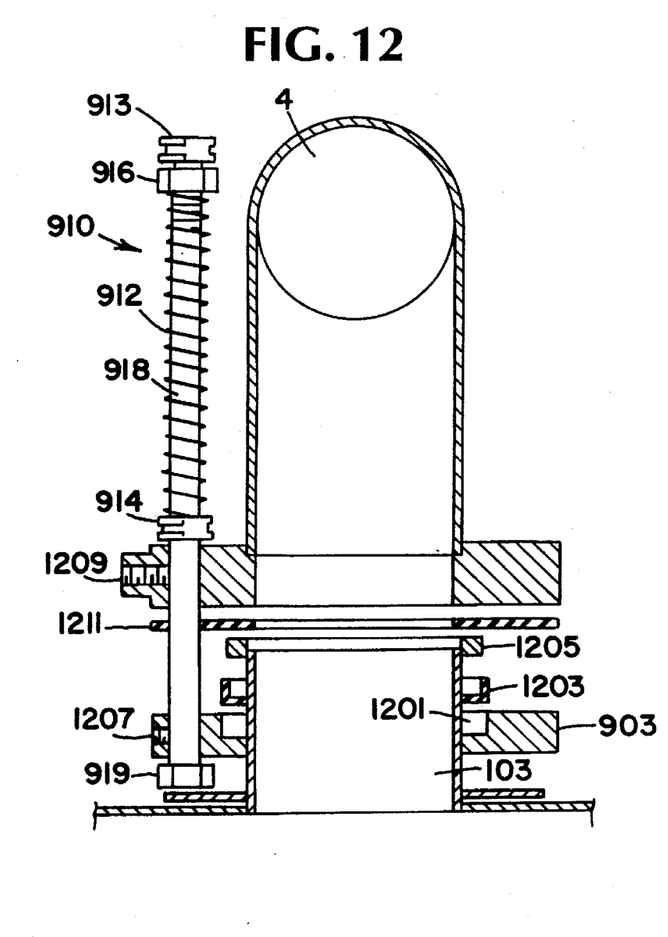
FIGS. 12 and 13 show more detailed views of a modified coupling arrangement of the embodiment shown in FIGS. 9 and 10.
Figure 13:
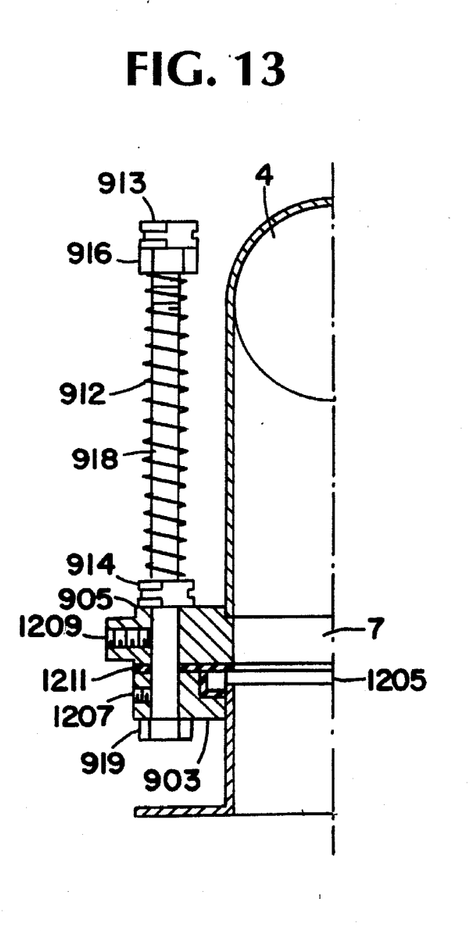

FIGS. 12 and 13 show another coupling arrangement between the hopper and the vacuum conduit 4 which permits rotation of the hopper independent of the state of the flanges 903 and 905. Referring to the exploded view of FIG. 12, there is shown the spring element 910 as depicted in FIG. 11. In FIG. 12, the threaded rod 918 extends through aligned apertures in the flanges 903 and 905, the coil spring 912 rests on the washer 914. The coil spring 912 is initially compressed by adjustment nut 916 and the lower end of the threaded rod 918 is coupled to the flange 903 by the jamb nut 919. Set screws 1207 and 1209 are inserted in the flanges 903 and 905, respectively, to prevent the threaded rod 918 from rotating. A seal ring 1211 mounted on the threaded rods of the spring elements 910, 920 and 930 provides a seal between the flanges 903 and 905 when the flanges are brought together. The structures of the spring elements 920 and 930 are substantially the same as described with respect to the spring element 910.

In order to permit the hopper to rotate during material transfer operations, the flange 903 in FIG. 12 is mounted below the top of the vacuum inlet 103 by suspending it on the threaded rods of the spring elements 910, 920 and 930 but is not attached to the vacuum inlet. A metal retaining ring 1205 is fixed to the top of the vacuum inlet 103 e.g., by welding. A rubber or other material seal ring 1203 is placed between the metal retaining ring 1205 and the flange 903 and the flange 903 is shaped to receive the seal ring 1203 and the metal retaining ring 1205 in the ring shaped space 1201 in the flange 903 when the flanges 903 and 905 are held together by vacuum pressure from the vacuum source 7. FIG. 13 shows a partial view of the coupling arrangement of FIG. 12 with the flanges 903 and 905 in a closed position with metal retaining ring 1205 inserted into the flange 903.

As is readily apparent from FIGS. 12 and 13, the vacuum inlet 103 and the metal retaining ring can be rotated relative the flange 903 both when the flange 903 is pressed against the flange 905 and when the flanges are separated. Accordingly, the rotation of the hopper by using by the coupling arrangement of FIGS. 12 and 13 results in greater freedom of movement of the material conduit 2 of FIGS. 1 and 8.

It is to be understood that the specific embodiments described herein are merely illustrative of the spirit and scope of the invention. Modifications can readily be made by those skilled in the art in accordance with the principles of the invention.

What is claimed is:

1. A material transfer system, comprising:

a vacuum source for applying a suction force; and a hopper which comprises:

a top section including a vacuum inlet coupled to the vacuum source;

a middle section extending below the top section, the middle section including a plurality of sides, each side extending downward and outward from the top section, a first of the plurality of sides including a material inlet and a second of the plurality of sides opposite the first side including a vibratory portion vibrating in response to vacuum pressure in the middle section caused by the suction force; and an openable bottom section held in a closed position against the plurality of downward and outward extending sides of the middle section by the suction force applied from the vacuum source to the vacuum inlet, wherein a material entering the middle section through the material inlet in response to the suction force applied to the vacuum inlet is directed to contact the vibratory portion on the second side and is redirected from the vibratory portion to the bottom section;

the top section further including valve means coupled between the vacuum source and the vacuum inlet responsive to a predetermined weight of the material in the bottom section for removing the suction force from the vacuum inlet to open the bottom section.

2. A material transfer system according to claim 1, wherein the valve means comprises:

a first apertured flange extending from the vacuum source;

a second apertured flange extending from the vacuum inlet held in contact with the first apertured flange to form a passageway from the vacuum source to the vacuum inlet; and separating means responsive to the predetermined amount of material in the bottom section for separating the first and second apertured flanges whereby the vacuum inlet is disconnected from the vacuum source.

3. A material transfer system according to claim 2, wherein the separating means comprises spring means for maintaining the first and second apertured flanges in contact until a weight of the material in the bottom section exceeds a predetermined value.

4. A material transfer system according to claim 3, wherein the spring means comprises:

a plurality of coil springs, each having a first end connected to the first apertured flange and a second end;

a rod connected to the second end of each coil spring extending through the first apertured flange and coupled to the second apertured flange; and means for adjusting a tension in each coil spring to separate the first and second apertured flanges responsive to the weight of the material in the bottom section exceeding the predetermined value.

5. A material transfer system for transferring a material including a compressible material between an excavation site and a location remote from the excavation, comprising:

a vacuum source; and a hopper which comprises:

an upper section including a suction inlet coupled to the vacuum source for applying a suction force;

a middle section including plural sides each extending downward and outward from the upper section, a material inlet in a first of the plural sides coupled to the excavation site or to the location remote from the excavation site and a second of the plural sides opposite the first side including a vibratory part opposite the material inlet in the first side; and an openable lower section held in a closed position against the downward and outward extending sides of the middle section by the suction force applied to the suction inlet, wherein, the compressible material entering the middle section from the excavation site through the material inlet in response to the suction force applied to the suction inlet contacts the vibratory part which vibrates in response to vacuum pressure in the middle section and the contacting material to redirect the material to the lower section, and wherein the upper section further includes valve means coupled between the vacuum source and the suction inlet responsive to a predetermined weight of the material in the bottom section for removing the suction force from the suction inlet to open the bottom section.

6. A material transfer system according to claim 5, wherein the valve means comprises:

a first apertured flange extending from the vacuum source;

a second apertured flange extending from the suction inlet held in a contact with the first apertured flange to form a passageway from the vacuum source to the suction inlet; and separating means responsive to the predetermined amount of material in the bottom section for separating the first and second apertured flanges whereby the suction inlet is disconnected from the vacuum source.

7. A material transfer system according to claim 6, wherein the separating means comprises spring means for maintaining the first and second apertured flanges in contact until a weight of the material in the bottom section exceeds a predetermined value.

8. A material transfer system according to claim 7, wherein the spring means comprises:

a plurality of coil springs, each having a first end connected to the first apertured flange and a second end;

a rod connected to the second end of each coil spring extending through the first apertured flange and coupled to the second apertured flange; and means for adjusting a tension in each coil spring to separate the first and second apertured flanges responsive to the weight of the material in the bottom section exceeding the predetermined value.

* * * * *